No. 873,702.    PATENTED DEC. 17, 1907.
E. F. W. ALEXANDERSON.
ALTERNATING CURRENT MOTOR.
APPLICATION FILED FEB. 15, 1904.

WITNESSES:

INVENTOR:
Ernst F. W. Alexanderson,
by Albert G. Davis
Atty.

No. 873,702. PATENTED DEC. 17, 1907.
E. F. W. ALEXANDERSON.
ALTERNATING CURRENT MOTOR.
APPLICATION FILED FEB. 15, 1904.

WITNESSES:

INVENTOR:
Ernst F. W. Alexanderson.
by
Atty.

No. 873,702. PATENTED DEC. 17, 1907.
E. F. W. ALEXANDERSON.
ALTERNATING CURRENT MOTOR.
APPLICATION FILED FEB. 15, 1904.

WITNESSES:

INVENTOR:
Ernst F. W. Alexanderson,
by Albert G. Davis
Atty.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT MOTOR.

No. 873,702.  Specification of Letters Patent.  Patented Dec. 17, 1907.

Application filed February 15, 1904. Serial No. 193,512.

*To all whom it may concern:*

Be it known that I, ERNST F. W. ALEXANDERSON, a subject of the King of Sweden, residing at Schenectady, county of Schenectady, State of New York, have invented certain new and useful Improvements in Alternating-Current Motors, of which the following is a specification.

My invention relates to alternating current motors, and one of its objects is to provide a novel form of motor which shall be capable of synchronous operation at a plurality of speeds, and another of its objects is to provide such a motor which shall be able to start from rest under load, to pass under load from one synchronous speed to another, and to assume automatically the characteristics of a synchronous motor at each of its speeds.

Synchronous motors have been designed heretofore that would start from rest and automatically fall into synchronism, but since the requirements of design for a synchronous motor are different from those of a self-starting motor, such machines heretofore have been very inefficient either at starting or at full speed. Motors designed for efficient operation at synchronism have possessed so little starting torque that it has been necessary to start them without load. On the other hand, attempts to give the motor a good starting torque have reduced the efficiency at synchronism.

One feature of my invention consists in suitably altering the motor connections so as to produce at starting proper characteristics of the motor for a good starting torque and to obtain the different characteristics essential for efficient operation at synchronism. Since, at starting, the motor operates as an induction motor, the field not being energized, the armature flux must provide the entire counter-electromotive force necessary, and consequently the impressed voltage per turn of the armature winding should be less than at synchronism when the counter-electromotive force is supplied by the direct current field flux. I provide means for varying the impressed voltage per armature turn without using a transformer by varying in a simple manner the relative connections of the armature coils.

Another feature of my invention consists in the arrangement whereby a plurality of synchronous speeds are obtained by means of simple alterations in the motor connections. Arrangements have been devised heretofore for varying in specific ratios the speeds of asynchronous motors by varying the number of poles. Such arrangements are described in United States Patent No. 606,056, granted June 21, 1898, to Hassler, and No. 725,415, granted Apr. 14, 1903, to Dahlander and Lindstrom. But these arrangements show means for obtaining specific speed ratios only, and only in asynchronous motors. In my application for United States Letters Patent, Ser. No. 166,675, filed July 23, 1903, I have described a general method for varying the number of poles of a motor winding whereby any desired speed ratios may be obtained. By my present invention I provide a construction of both members of a motor adapted to the application of my former invention and thereby provide a synchronous motor capable of operation at a plurality of speeds.

Another feature of my invention consists in varying the motor connections to meet the varying requirements of efficient operation as the number of poles is altered. With a constant impressed voltage per coil of the armature winding, the flux per pole remains constant while the number of poles is varied. For instance, if the number of poles is doubled, the total flux must be doubled, since each conductor must produce the same counter-electromotive force as before, and consequently each pole must have the same flux as before and this means that the magnetic density is doubled. To produce the same flux each pole must consequently have twice as many ampere turns as before, and since the number of conductors per pole is reduced one-half, the current per conductor must be quadrupled. That is, the exciting current varies with the square of the number of poles. To avoid the necessity for this great variation in exciting current and consequent inefficiency, I provide means for varying the impressed voltage per coil of the armature winding as the number of poles is varied, thereby securing efficient magnetic conditions for all values of the number of poles.

My invention will best be understood by reference to the accompanying drawings, in which Figs. 1<sup>×</sup> to 15<sup>×</sup> inclusive, show diagrammatically the circuit connections produced by the controlling switch in Fig. 1 in its positions 1 to 15 respectively.

Figure 1:
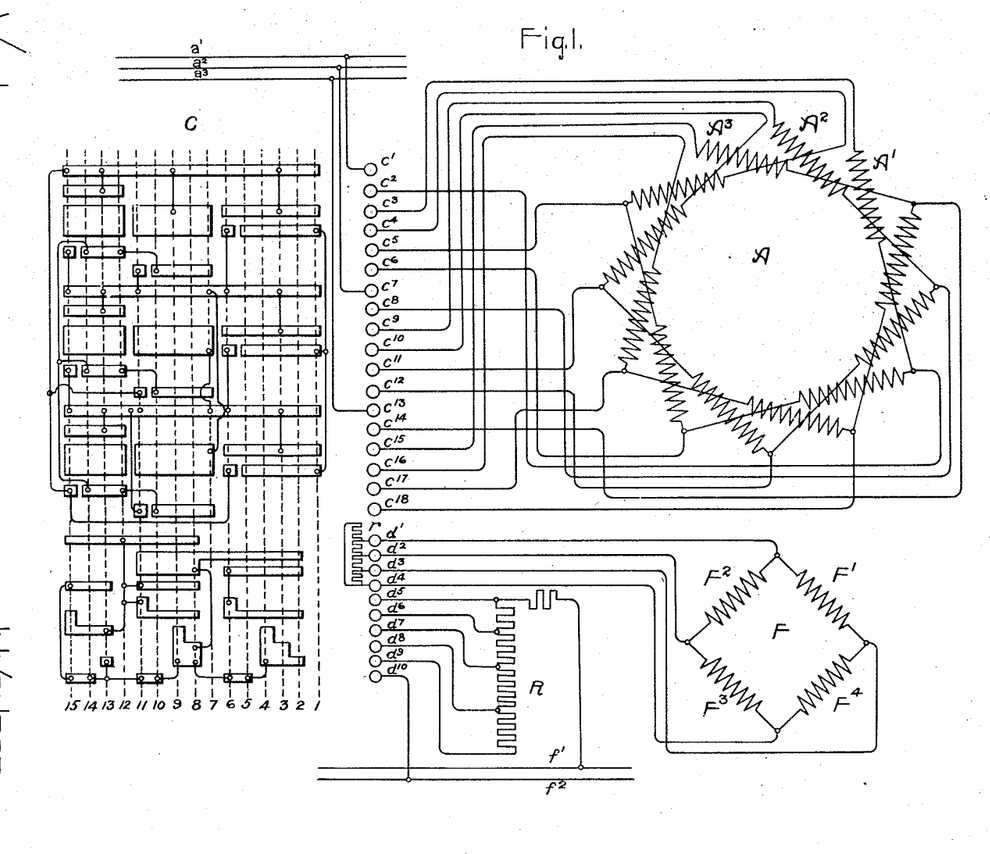
Figure 1 shows diagrammatically a motor arranged in accordance with my invention, together with circuit connections and a controlling switch therefor adapted to provide three synchronous speeds and to control the motor, in starting from rest under load, and in passing from one synchronous speed to another.
Figure 1X:
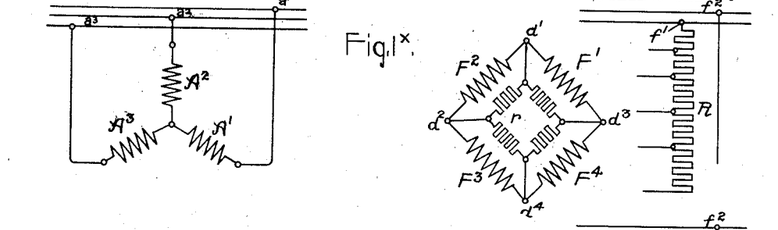
Figure 2:
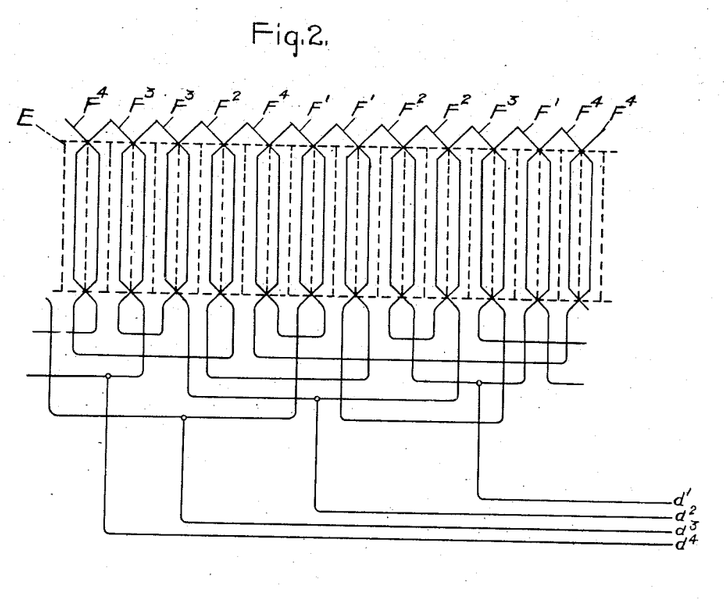
Fig. 2 shows a development on a plane surface of the field winding of a motor constructed in accordance with my invention.
Figure 2X:
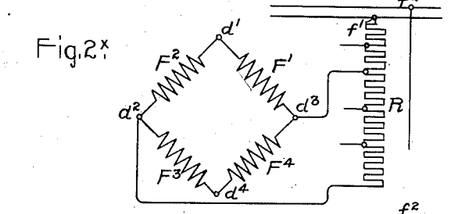
Figure 3X:
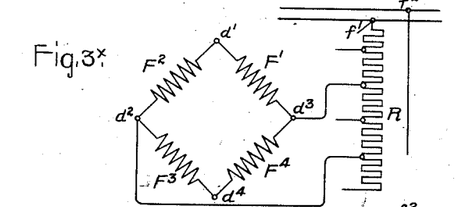
Figure 4X:
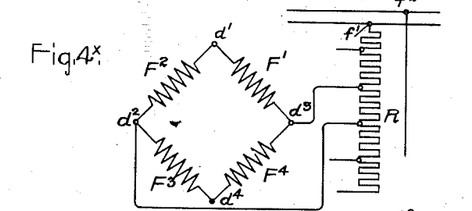
Figure 5X:
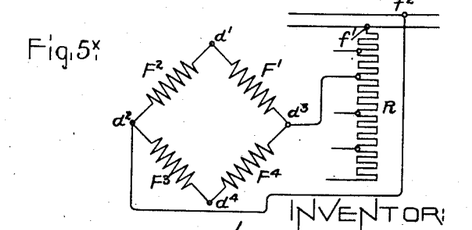
Figure 6:
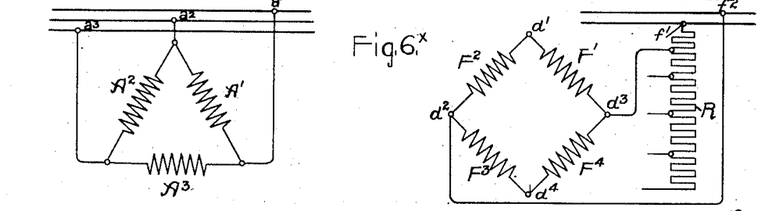

Referring first to Fig. 1, A represents the armature of a motor constructed in accordance with my invention. I have indicated diagrammatically a three-phase winding by means of three rectangles $A^1$, $A^2$, $A^3$, displaced from each other as shown. F represents the field winding which I have shown as a rectangle formed by the four coils or circuits $F^1$, $F^2$, $F^3$, $F^4$. The form of winding which I have thus indicated by a rectangle is the form described in my former application, Serial No. 166,676, filed July 23, 1903, which has been mentioned heretofore. This type of winding is fully explained in the above specification, but I have provided an illustration of this winding in Fig. 2, and will give a short explanation of it here. The winding in Fig. 2 shows a development on a plane surface of the field winding F of Fig. 1. Since each phase of the armature winding A is arranged similarly to the field winding, Fig. 2 will also serve as an illustration of each phase of the armature winding.

If a distributed winding of any type be considered, as for instance, the winding of a drum armature, it will be evident, regardless of the number of poles, that the current in half of the conductors on the surface of the armature is flowing in one direction, while the current in the remaining half is flowing in the opposite direction. Furthermore, the current in the conductors on one side of the center of a pole is in one direction, while the current in the conductors on the other side of the center of the pole is in the other direction. In other words the position of a pole is determined by a point on the winding where the current in adjacent conductors is in opposite directions. Thus, in a bi-polar winding the current in all the conductors within a semi-circumference is in one direction, while the current in all conductors within the other semi-circumference is in the other direction; there being consequently only two points on the circumference where the current in adjacent conductors is in opposite directions. In a four-pole winding there will be four points on the circumference where the current in adjacent conductors is in opposite directions,—that is, all the conductors embraced within an arc of 90 degrees will be traversed by currents in the same direction, while the conductors within 90 degree arcs, on either side, will be traversed by currents in the opposite direction.

It is evident from the above that the number of poles produced by the distributed winding may be varied by varying the direction of the current through properly selected conductors. In my former application, above mentioned, I have shown how this may be accomplished in a simple manner without using a great number of terminal connections. The method may be shortly described as follows. If a winding with a certain number of conductors be given, the position and number of poles may be selected arbitrarily, and the desired direction of current in each of the conductors thereby determined. If now, other polar numbers be selected, according to the speed ratio desired and the proper direction of current in each conductor determined for each pole number, it will be found that in some conductors the current is in the same direction for all the selected values of pole numbers. In each conductor of another set the current will vary in the same manner for the various numbers of poles. In each conductor of still another set the current will vary in a still different manner for the different numbers of poles, but the variation will be the same in each conductor of the set. Accordingly, when the conductors are thus portioned off into groups, each group containing those conductors in which the current varies in the same manner throughout the variations in the number of poles, all the conductors in each group may be connected in series and the terminal connections of the several groups properly varied to vary the number of poles. By this means the necessity for bringing the terminals of each conductor or coil to a controlling switch is avoided, and the variation of the number of poles may be accomplished in a simple manner. Thus, in Fig. 2, I have shown twenty-four conductors connected in four groups of six conductors each. One group is indicated by the letter $F^1$, another group by the letter $F^2$, etc. Furthermore, the groups are permanently connected together, the group $F^2$ having one terminal connected to the group $F^1$, and the other terminal to the group $F^3$. This connection is indicated diagrammatically in Fig. 1 by the rectangle. If the terminal $d'$, connected to the junction of group $F^1$ and group $F^2$ be connected to one terminal of a source of current, and if the terminal $d^4$, which is connected to the junction of groups $F^3$ and $F^4$ be connected to the other terminal of the source of current, it will be found by tracing out the current-flow in the conductors that six poles are produced by the winding, whereas, if terminals $d^2$ and $d^3$, which are connected respectively to the junction of groups $F^2$ and $F^3$, and $F^1$ and $F^4$, are connected to the source of current, twelve poles will be produced. By connecting terminals $d'$ and $d^4$ together and to one terminal of the source, while $d^2$ and $d^3$ are connected together and to the other terminal, eight poles are produced. Thus, by a simple variation in connections, four, six, or eight poles may be produced by this winding, and only four slip rings are needed for the various circuit connections.

Since each rectangle of armature A indicates a similar winding, similar variations in the connections of each phase of the armature produce similar variations in the number of poles. Referring now to Fig. 1, it will be seen that when the controlling switch is moved into its first position indicated by dotted line 1, current will pass from line-wire $a^1$ to rectangle A' through the entire rectangle. Here the current divides, part passing through rectangle $A^2$ to line-wire $a^2$, and part through rectangle $A^3$ to line-wire $a^3$. Thus the three phases of the armature are connected in Y, as shown in Fig. $1^\times$. In position 1 of the controller C, none of the controller fingers $d'$, etc., connected to the field F are in engagement with any of the movable contacts of the controller. The field winding F is consequently merely short-circuited through the resistance $r$, which may be permanently connected to the contact fingers. This connection is also shown in Fig. $1^\times$. The field acts as the secondary of an induction motor, starts from rest, and runs up to a speed depending upon the design of the motor windings, and upon the value of the resistance $r$. In order to improve the starting torque I provide, in addition to the winding F a short-circuited squirrel-cage winding, which is indicated in Fig. 2 by E. This winding E may be placed in the same slots with the winding F, or in different slots, as shown in Fig. 2. This short-circuited winding not only increases the starting torque of the motor, but also acts to prevent hunting when the motor is operating synchronously, and thereby assists to maintain the motor in synchronism. As the controlling switch C, in Fig. 1, is moved to its second position, as indicated by dotted line 2, the circuits of the armature are not altered, but the contact fingers connected to field winding F come into engagement with the movable contacts.

The connections of the field circuit are indicated in Fig. $2^\times$, and may be traced from the arrangement of the controller contacts in Fig. 1. In this position of the controller the winding F is short-circuited through a portion of the resistance R. Resistance R acts as a shunt to the resistance $r$ (shown in Fig. $1^\times$ and is omitted in the following figures), and thereby increases the speed of the motor, diminishing its slip. As the controller passes to positions 3 and 4, the only change that takes place is the decrease of the portion of resistance R connected to winding F. At position 4, the field winding is wholly or nearly short-circuited as shown in Fig. $4^\times$. In this position the motor operates at a speed nearly up to synchronism. When the controller is moved to position 5, the field winding F is connected to the source of exciting current $f^1 f^2$, as indicated in $5^\times$, as will be seen from an inspection of the controller contacts of Fig. 1. The motor then automatically slips into synchronism, and, if the controller were left on this position, would operate continuously at its lowest synchronous speed. As has already been stated, however, the motor would not possess the highest efficiency, since the impressed voltage per coil of the armature is now too low for efficient operation, since the counter-electromotive force is now supplied by the direct current field flux. Consequently in order to increase the impressed voltage per turn of the armature I provide the position 6 of the controller, in which the phases of the armature are shifted from Y connection to delta connection, as will be seen from an inspection of the controller contacts, and as is shown diagrammatically in Fig. $6^\times$. At the same time, more of the resistance in series with the field is cut out, thereby impressing nearly the full voltage of the source upon the field winding. This is the final arrangement for the lowest synchronous speed. In order to pass to the next higher synchronous speed, the controller is shifted to position 7. In this position the arrangement of the armature connections is as indicated in Fig. $7^\times$. It will be seen that each phase of the armature has its halves connected in parallel instead of series, and the phases are again connected in Y. This connection of the halves of each phase in parallel corresponds to the connection that has already been described with reference to Fig. 2, whereby terminals $d^1$ and $d^4$ are connected together and to one terminal of the source, while terminals $d^2$ and $d^3$ were connected together and to the other terminal of the source. It will be remembered that by this arrangement, the number of poles was decreased from twelve to eight. Since each phase of the armature winding is arranged in the same manner as the winding shown in Fig. 2 by means of the changes indicated in Fig. $7^\times$, the number of poles of the armature is changed from twelve to eight, and the synchronous speed correspondingly increased. Furthermore, it has already been explained that when the number of poles is decreased, in order to secure proper operation, the impressed voltage per coil of the armature should be increased. This also is accomplished by the change indicated in Fig. $7^\times$. The impressed voltage per coil is now twice the value in the arrangement of Fig. $1^\times$. The field winding F is again disconnected from the source of excitation, and is short circuited through the resistance $r$. The motor speeds up on account of the decrease of the number of poles of the armature, and the controller is shifted to positions 8 and 9 to further increase the speed. At position 10 the field F is again connected to the source of excitation with a resistance in series, and it will be noticed that the same change has been made in the terminal connections of the field winding that has been made in the armature. Consequently the number of poles of the field winding is also decreased from twelve to eight, and is of the proper number for synchronous operation. In position $11^\times$ the armature winding is again changed from Y to delta connection for the purpose that has been explained, and the resistance in series with the field is nearly all cut out. This position of the controller is the final position with the second synchronous speed of the motor. To increase the speed of the motor to its highest value, the controller is moved to position $12^\times$. The armature is again connected in Y, but the points of connection to the several phases are varied as will be seen from an inspection of the controller contacts, and as is indicated in Fig. $12^\times$. By this variation the number of poles is reduced from eight to six by the method that has already been explained. The field winding is again left short-circuited through resistance $r$, and the speed of the motor increases. In position 13 the short-circuiting resistance is again diminished. In position 14 the field is connected to the source of current with a resistance in series, and at this point slips into its highest synchronous speed. This time terminals $d'$ and $d^4$ are connected to the source of current, thereby producing six field poles, as has already been explained. In position 15 the armature is again connected in delta in order to increase the efficiency of operation of the motor, as has been heretofore explained, and the resistance of the field is decreased. By comparing Figs. $6^\times$ to $15^\times$, it will be seen that the voltage impressed upon each armature circuit is twice as great in Fig. $15^\times$ as in Fig. $6^\times$. Consequently, the exciting current in each armature circuit, if the number of poles were the same, would be twice as great in Fig. $15^\times$ as in Fig. $6^\times$. Furthermore, there are twice as many armature circuits in Fig. $15^\times$. Consequently the total exciting current would be four times greater in the arrangement of Fig. $15^\times$ than in Fig. $6^\times$. But Fig. $15^\times$ corresponds to a six-pole arrangement, while Fig. $6^\times$ corresponds to a twelve-pole arrangement: that is, the number of poles has been reduced one-half, which with the same impressed voltage per coil would reduce the exciting current to one-fourth its former value. Consequently the variation in number of poles is balanced by the change in connections and this is exactly the arrangement that is desirable in order to secure most efficient magnetic conditions of the motor, since the total flux of the motor is the same in both cases.

Figure 11:
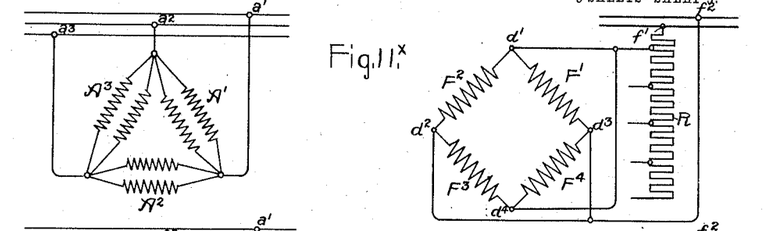
Figure 15:
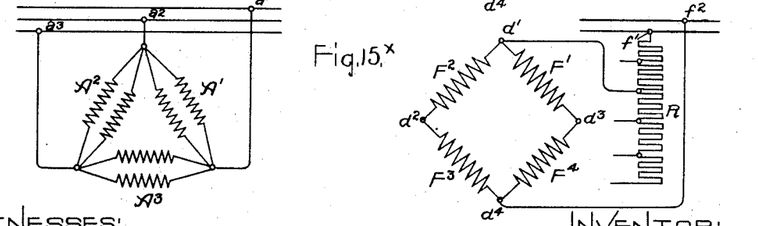

In order to avoid further complication in the circuits, the arrangement of Fig. $15^\times$ was reached in position 11 of the controller as regards the armature circuit. Consequently, the magnetic conditions at position 11 are not exactly the same as at positions 6 and 15; but there is not sufficient variation to interfere with the efficiency of the motor or to warrant further complication of the circuits in order to produce exact similarity in the magnetic conditions. The difference in the amount of exciting current required is taken care of by the connections of the field circuit in Fig. $11^\times$. It will be seen that nearly the total voltage of the source is impressed upon each of the four circuits of the field winding, while in Fig. $15^\times$ a little less than half the voltage of the source is impressed upon each field winding circuit, since a resistance is left in series with the field circuit. The resistances left in series with the field in the two cases are proportioned to give the proper exciting current in each case.

Figure 7:
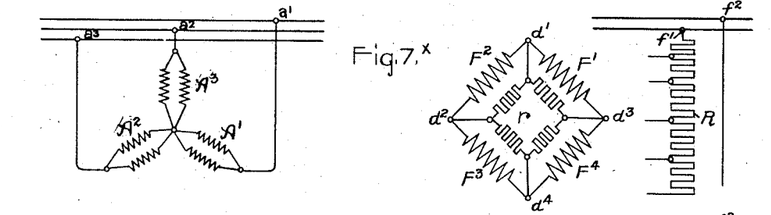
Figure 8:
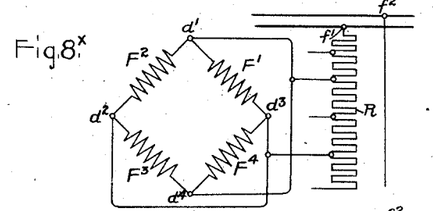
Figure 9:
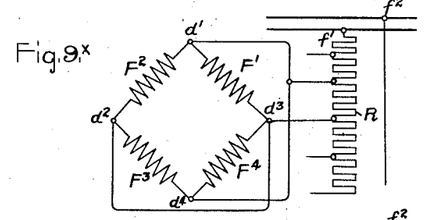
Figure 10:
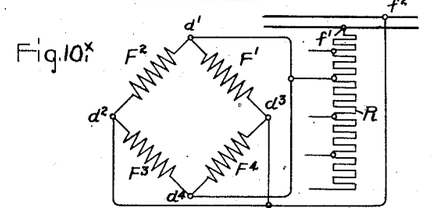
Figure 12:
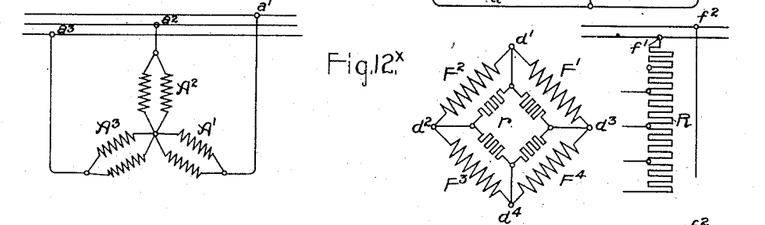
Figure 13:
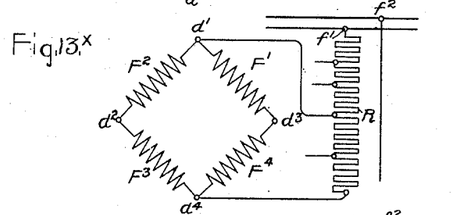
Figure 14:
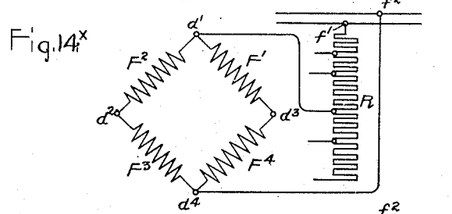

The resistance $r$, which is shown in Fig. 1 and in Figs. $1^\times$, $7^\times$ and $12^\times$ is preferably left permanently connected to the field windings, as shown in Fig. 1. This resistance acts as a discharge resistance for the field, and if designed with proper value to act as starting resistance for the first position of the controller it will be of a sufficiently high value to produce only a negligible loss during synchronous operation.

Although in Fig. 1 I have indicated the motor windings diagrammatically for the sake of simplicity, and although in Fig. 2 I have shown in the development only one conductor per slot, it will be understood that any well known form of winding having any desired number of conductors in a slot may be employed, and the conductors connected in proper groups, according to my invention. Furthermore, many variations may be made in the arrangement of the controlling switch, and in the circuit connections for the different positions without departing from the spirit of my invention. Moreover, although I have shown my invention applied to a synchronous motor designed to start from rest unto load, and to operate at a plurality of synchronous speeds, it is evident that my invention comprises a number of features which may be used together or separately in machines designed for various purposes. For instance by the use of my invention for varying the number of poles of both the armature and field winding, such a machine as I have described may be employed as an alternating current generator, and when driven at constant speed will be capable of generating alternating current at variable frequencies. Moreover, that feature of my invention which relates to varying the impressed voltage per turn of the armature winding may be used with advantage on any synchronous motor designed to start from rest, whether such motor has more than one synchronous speed or not. Also, that feature of my invention which relates to varying the impressed voltage per turn of the motor winding, as the number of poles is varied, is applicable to any alternating current motor, whether of the synchronous or of the non-synchronous type. Accordingly, I do not desire to limit myself to the particular construction and arrangement of parts here shown, since changes which do not depart from the spirit of my invention, and which are within the scope of the appended claims, will be obvious to those skilled in the art.

What I claim as new and desire to secure by Letters Patent of the United States, is:

1. In combination, a dynamo-electric machine having a distributed winding on each member, the conductors of each winding being permanently connected in groups, an external circuit connected to each winding, and means for varying the number of poles of both members.

2. In combination, a dynamo-electric machine having distributed armature and field windings, the conductors of each winding being connected in groups, an external circuit connected to each winding, and means for varying the relative connections of said groups to said external circuits without disturbing the connections between said groups.

3. In combination, a synchronous dynamo-electric machine having one or more distributed windings on each member, all the conductors of each winding being permanently connected in series, an alternating-current circuit connected to the armature winding, a direct-current circuit connected to the field winding, and means for varying the number of poles of each winding by varying the points of connection of said circuits to said windings.

4. In combination, a synchronous motor for operation with different pole numbers having distributed windings on both members, a source of alternating-current for the armature winding, a source of direct-current for the field winding, means for varying the number of poles of both windings, and means for connecting portions of the armature winding in series and in parallel to the alternating-current source.

5. In combination, a synchronous motor for operation with different pole numbers having distributed windings on both members, a source of alternating-current for the armature winding, a source of direct-current for the field winding, means for varying the number of poles of both windings, and means for varying the connections of the armature winding to vary the impressed alternating voltage per turn.

6. In combination, a multi-speed three-phase motor, a source of current therefor, means for varying the number of poles of the winding of each phase of the motor, and means for connecting the phases in Y and in delta.

7. In combination, a synchronous motor, a source of alternating current connected to the armature thereof, means for short-circuiting the field winding at starting, means for connecting said field winding to a source of direct current at synchronism, and means for varying the relative connections of portions of the armature winding to the source.

8. In combination, a synchronous motor, a source of alternating current connected to the armature thereof, means for short-circuiting the field winding at starting, means for connecting said field winding to a source of direct current at synchronism, and means for varying the connections of the armature winding to vary the impressed voltage per turn of the armature winding.

9. In combination, a synchronous motor designed for starting as an induction motor, and means for varying the connections of the armature to vary the impressed voltage per turn of the armature winding.

10. In combination, a three-phase synchronous motor designed for starting as an induction motor, and means for connecting the phases in Y at starting and in delta at synchronism.

11. In combination, a three-phase synchronous motor, a source of three-phase current for the armature, a source of direct current for the field, and a switch adapted to connect the armature in Y to the three-phase source and to short-circuit the field at starting, and then to connect the field to the direct current source and to change the armature connections to delta.

12. In combination, a three-phase synchronous motor, a source of three-phase current for the armature, a source of direct current for the field, a resistance, and a switch adapted to connect the armature in Y to the three-phase source and to short-circuit the field through the resistance at starting, then to cut out said resistance, and then to connect the field to the direct current source and to change the armature connections to delta.

13. In combination, a synchronous motor designed for starting as an induction motor, and means for connecting portions of the armature winding in series and in parallel.

14. In combination, a three-phase synchronous motor designed for starting as an induction motor, and means for connecting portions of the armature winding in series and in parallel and in Y and in delta.

15. In combination, a multi-speed three-phase motor, and means for connecting portions of the motor winding in series and in parallel and connecting the motor winding in Y and in delta.

16. In a synchronous machine for operation with different pole numbers, an armature winding, a field winding, each winding having its conductors permanently connected in groups in which the current flow in all conductors of the group is in the same relative direction for all pole numbers of the motor, and means for varying the relative connections of the groups of both windings to the supply sources.

17. In a synchronous machine for operation with different pole numbers, distributed windings on both members having their conductors connected together in groups and provided with terminals, the conductors of said windings being so associated with each other and with said terminals that by changes of the coupling of said terminals the number of poles of the winding may be changed, and means for changing the coupling of the terminals of both members.

18. In a synchronous machine for operation with different pole numbers, distributed windings on both members consisting of coils having their conductors connected to form a plurality of groups permanently connected together, terminals located in said circuit at points between said groups, and means for changing the direction of current flow through said groups.

19. In combination, a synchronous motor, a source of alternating current connected to the armature, means for short-circuiting the field at starting, means for energizing the field at synchronism, and means for varying the armature connections at synchronism to increase the impressed voltage per coil.

20. In a multi-speed three-phase motor, an armature winding adapted to be connected for different numbers of poles and to be connected in Y and in delta.

21. A synchronous machine for operation with different pole numbers, distributed windings on both members consisting of coils permanently connected in groups and adapted to produce different numbers of poles by a variation in the relative connections of said groups to the external circuits.

22. A synchronous machine for operation with different pole numbers, one or more distributed windings on each member, all the conductors of each winding being permanently connected in series, said windings being adapted to produce different numbers of poles by a variation in the points of connection of said windings to the external circuits.

23. In combination, a multi-speed synchronous motor, a source of alternating current for the armature thereof, a source of direct current for the field, and means for short-circuiting the field when passing from one synchronous speed to another.

24. In combination, a multi-speed synchronous motor, a source of alternating current for the armature thereof, a source of direct current for the field, and means for short-circuiting the field when starting from rest and when passing from one synchronous speed to another.

25. A synchronous machine for operation with different pole numbers, distributed windings on both members consisting of coils adapted to produce different numbers of poles by variation in the relative connections of said coils to the external circuits, an alternating-current circuit connected to the armature winding and a direct-current circuit connected to the field winding.

26. A synchronous machine for operation with different pole numbers having a winding on each member adapted to produce different numbers of poles with different connections, means for varying the connections of both windings, an alternating-current circuit connected to the armature winding, and a direct-current circuit connected to the field winding.

27. In a synchronous motor, a distributed winding, an auxiliary short-circuited winding on the field structure for starting, and means for closing the field circuit through a variable resistance to bring the motor approximately to synchronism.

28. In a synchronous motor, distributed windings on both members, and an auxiliary short-circuited winding on the field structure.

29. In a multi-speed synchronous motor, distributed windings on both members, means for connecting both windings for different numbers of poles, and an auxiliary short-circuited winding on the field structure.

30. In a synchronous machine for operation with different pole numbers, an armature winding, a field winding, each winding having all its conductors in which the direction of current flow is the same for all pole numbers permanently connected in a group, and means of varying the relative connections of the groups of both windings to the supply sources.

In witness whereof I have hereunto set my hand this 12th day of February, 1904.

ERNST F. W. ALEXANDERSON.

Witnesses:
BENJAMIN B. HULL,
HELEN ORFORD.